(12) United States Patent
Andreoli-Fang

(10) Patent No.: US 12,101,729 B2
(45) Date of Patent: *Sep. 24, 2024

(54) EDGE COMMUNICATION NETWORKS WITH EDGE-LOCATED CLOCKS AND ASSOCIATED METHODS

(71) Applicant: Cable Television Laboratories, Inc., Louisville, CO (US)

(72) Inventor: Jennifer Andreoli-Fang, Boulder, CO (US)

(73) Assignee: Cable Television Laboratories, Inc., Louisville, CO (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/349,725

(22) Filed: Jul. 10, 2023

(65) Prior Publication Data

US 2023/0354227 A1 Nov. 2, 2023

Related U.S. Application Data

(63) Continuation of application No. 17/706,235, filed on Mar. 28, 2022, now Pat. No. 11,700,588, which is a continuation of application No. 16/504,105, filed on Jul. 5, 2019, now Pat. No. 11,290,970.

(60) Provisional application No. 62/694,105, filed on Jul. 5, 2018.

(51) Int. Cl.
| | |
|---|---|
| *H04W 56/00* | (2009.01) |
| *H04J 3/06* | (2006.01) |
| *H04L 43/04* | (2022.01) |
| *H04W 72/0446* | (2023.01) |

(52) U.S. Cl.
CPC ......... *H04W 56/001* (2013.01); *H04J 3/0667* (2013.01); *H04L 43/04* (2013.01); *H04W 56/0045* (2013.01); *H04W 72/0446* (2013.01)

(58) Field of Classification Search
CPC . H04W 56/002; H04W 56/001; H04J 3/0655; H04J 3/0644; H04J 3/0667; H04J 14/0201; H04J 3/0602; H04J 3/0682; H04J 3/0688; H04J 3/0664; H04J 3/0673; H04J 3/0661; H04L 7/048; H04L 7/033; H04L 12/4625; H04L 12/2801
See application file for complete search history.

(56) References Cited

U.S. PATENT DOCUMENTS

| | | | |
|---|---|---|---|
| 8,718,482 B1* | 5/2014 | Roberts | H04B 10/27 398/53 |
| 9,319,100 B2* | 4/2016 | Achanta | H04J 3/0638 |
| 2013/0121352 A1* | 5/2013 | Shen | H04J 3/0667 370/503 |
| 2018/0206203 A1* | 7/2018 | Ruffini | H04J 3/0655 |

(Continued)

*Primary Examiner* — Jung Liu
(74) *Attorney, Agent, or Firm* — PdZ Patent Law, PLLC

(57) ABSTRACT

A method for synchronizing a timing end application (TEA) in an edge communication network includes (a) receiving, at a first access device, a time stamp from a first TEA communicatively coupled to the first access device, (b) transmitting the time stamp from the first access device to a second access device via communication media of the edge communication network, (c) adjusting the time stamp to account for transit time of the time stamp from the first access device to the second access device, and (d) after adjusting the time stamp, transmitting the time stamp from the second access device to a second TEA communicatively coupled to the second access device.

20 Claims, 12 Drawing Sheets

(56) References Cited

U.S. PATENT DOCUMENTS

2019/0334643 A1* 10/2019 Neugeboren ........... H04L 7/033
2020/0319324 A1* 10/2020 Au ........................ H04W 48/16

* cited by examiner

EDGE COMMUNICATION NETWORKS WITH EDGE-LOCATED CLOCKS AND ASSOCIATED METHODS

RELATED APPLICATIONS

This application is a continuation of U.S. patent application Ser. No. 17/706,235, filed on Mar. 28, 2022, which is a continuation of U.S. patent application Ser. No. 16/504,105, filed on Jul. 5, 2019, now U.S. Pat. No. 11,290,970, which application claims benefit of priority to U.S. Provisional Patent Application Ser. No. 62/694,105, filed on Jul. 5, 2018. Each of the aforementioned patent applications is incorporated herein by reference.

BACKGROUND

Edge communication networks are used to provide communication services to subscribers. For example, edge communication networks are widely used to provide voice, data, and/or video communication services to residential subscribers and to business subscribers. Edge communication networks are also increasingly being used to provide backhaul communication services to wireless base stations. Examples of edge communication networks include, but are not limited to, data over cable service interface specification (DOCSIS) networks, digital subscriber line (DSL) networks, ethernet passive optical network (EPON) networks, radio frequency over glass (RFOG) networks, and a gigabit passive optical network (GPON) networks. Edge communication networks may use a common communication medium, such as a common optical cable or a common coaxial electrical cable, to serve multiple subscribers.

DETAILED DESCRIPTION OF THE EMBODIMENTS

Figure 1:
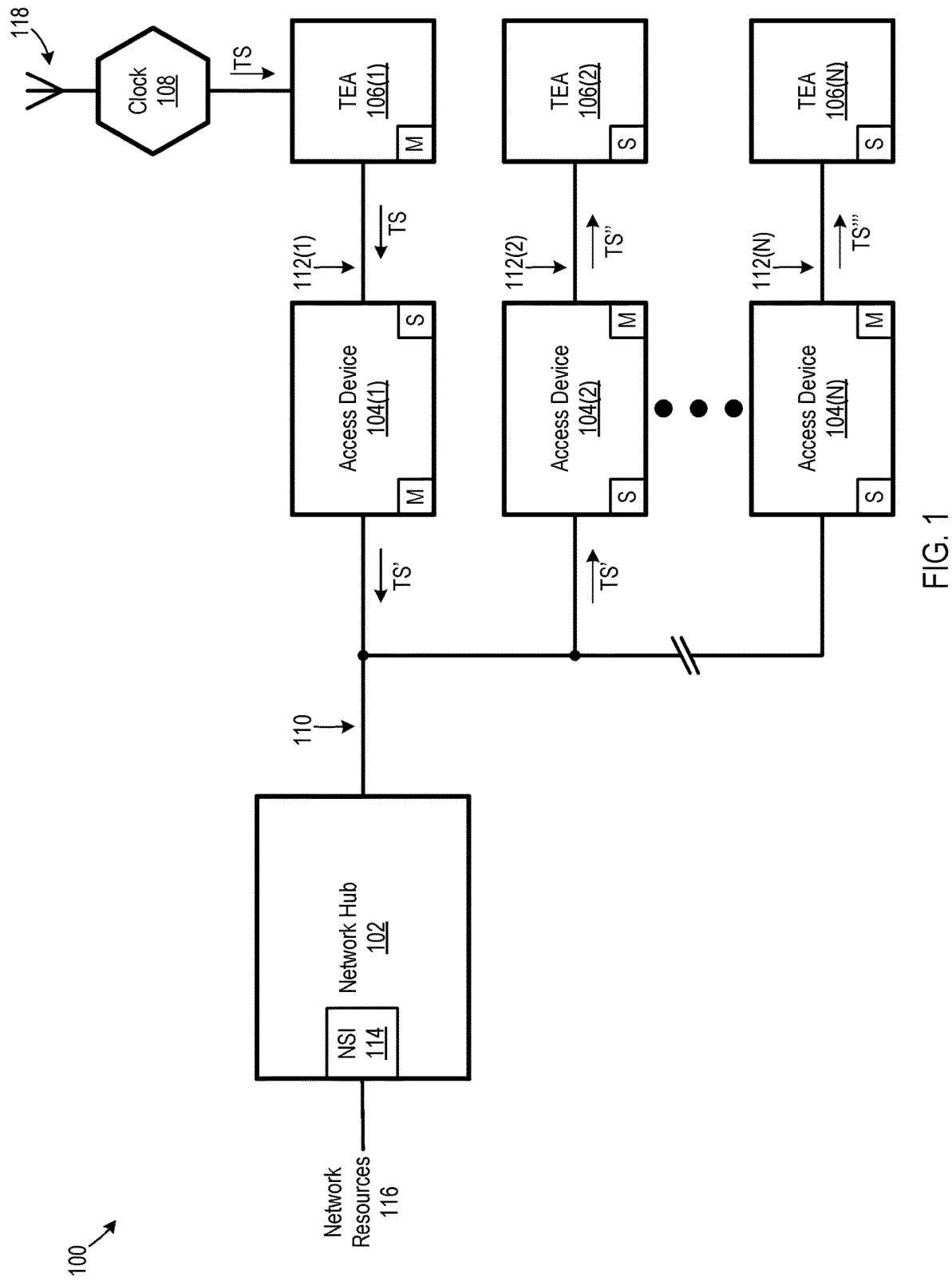
FIG. 1 is a block diagram illustrating an edge communication network including an edge-located clock, according to an embodiment.

Some edge communication network applications, referred to as timing end applications (TEAs), require precise synchronization. One example of a TEA is an advanced wireless base station which requires precise synchronization with other wireless base stations. Synchronization is conventionally achieved, for example, in an edge communication network by providing a grandmaster clock communicatively coupled to a network side interface (NSI) of a network hub. The grandmaster clock generates time stamps which are transmitted to TEAs via messages traversing the edge communication network via one or more hops, where each hop corresponds to transmission of a time stamp (or other data) from one network element to another network element. At each hop in the edge communication network, a "master" clock transmits a time stamp to a "slave" clock, and the slave clock adjusts the time stamp to compensate for transmission delay of the hop. There may be multiple hops between a grandmaster clock and a recipient TEA, thereby requiring multiple adjustments to the time stamp. In some cases, the messages are sent according to a Precision Time Protocol (PTP), a Network Time Protocol (NTP) or a DOCSIS Time Protocol (DTP). The TEAs use the time stamps for synchronization.

This synchronization approach, however, may have drawbacks, particularly in large edge communication networks. For example, large edge communication networks typically include numerous active network devices, such as routers and switches. Consequently, time stamps generated by a grandmaster clock located upstream of a network hub will typically travel through multiple network devices before reaching destination TEAs, such that the time stamps require multiple hops to reach destination TEAs. Each network device introduces errors and/or imprecisions which impair synchronization. Although errors and imprecisions can generally be minimized by use of high-performance components in network elements, high-performance components are relatively expensive. Additionally, time errors are cumulative, and small errors introduced by each network hop may therefore collectively result in a large error. Furthermore, time stamp adjustment consumes network resources and contributes to network complexity. Additionally, time stamp transmission delay may be inconsistent, resulting in time stamp jitter. Such jitter may be difficult to compensate for because jitter is often non-deterministic. Moreover, the time stamps may have to travel a significant distance through communication media, e.g. optical and/or electrical cables, to reach destination TEAs in conventional edge communication networks, which further increases time stamp cumulative time error and potential for time stamp corruption.

Disclosed herein are edge communication networks for synchronizing TEAs and associated methods which at least partially overcome one or more of the above-discussed drawbacks of conventional edge communication networks. The new edge communication networks include at least one edge-located clock, such as a clock communicatively coupled to a TEA, such as via one or more hops. Communicatively coupling a clock to a TEA, instead of to a network hub's NSI, advantageously enables time stamps to be generated relatively close to destination TEAs. Consequently, the new edge communication networks help minimize the number of active network devices, as well as communication media distance, that time stamps must travel through to reach destination TEAs. Consequently, cumulative time error that results from timing information having to traverse the network is significantly reduced. Additionally, the new edge communication networks advantageously facilitate sharing of a more accurate clock by multiple TEAs.

FIG. 1 is a block diagram illustrating an edge communication network 100, which is one embodiment of the new edge communication networks disclosed herein. Edge communication network 100 includes network hub 102, N access devices 104, N TEAs 106, and a clock 108. Although FIG. 1 illustrates N being greater than two, N could be any integer greater than one without departing from the scope hereof. In this document, specific instances of an item may be referred to by use of a numeral in parentheses (e.g., access device 104(1)) while numerals without parentheses refer to any such item (e.g., access devices 104). Network hub 102 is communicatively coupled to access devices 104 via communication media 110. Each access device 104 is communicatively coupled to a respective TEA 106 via a respective communication medium 112. Clock 108 is communicatively coupled to TEA 106(1).

Network hub 102 includes a NSI 114 communicatively coupled to network resources 116. Network hub 102 interfaces access devices 104 with network resources 116. Examples of network resources 116 include, but are not limited to, the public Internet, voice communication applications, conferencing applications, and/or content delivery applications. In some embodiments, network resources 116 are part of another network, such as a core communication network. In some embodiments, network hub 102 includes a wireless or wired relay node, an Ethernet switch, a cable modem termination system (CMTS), an optical line terminal (OLT), a wireless communication termination system, a wireless relay system, or a digital subscriber line access multiplexer (DSLAM). These systems are altogether known as modem termination system (MTS).

Figure 9:
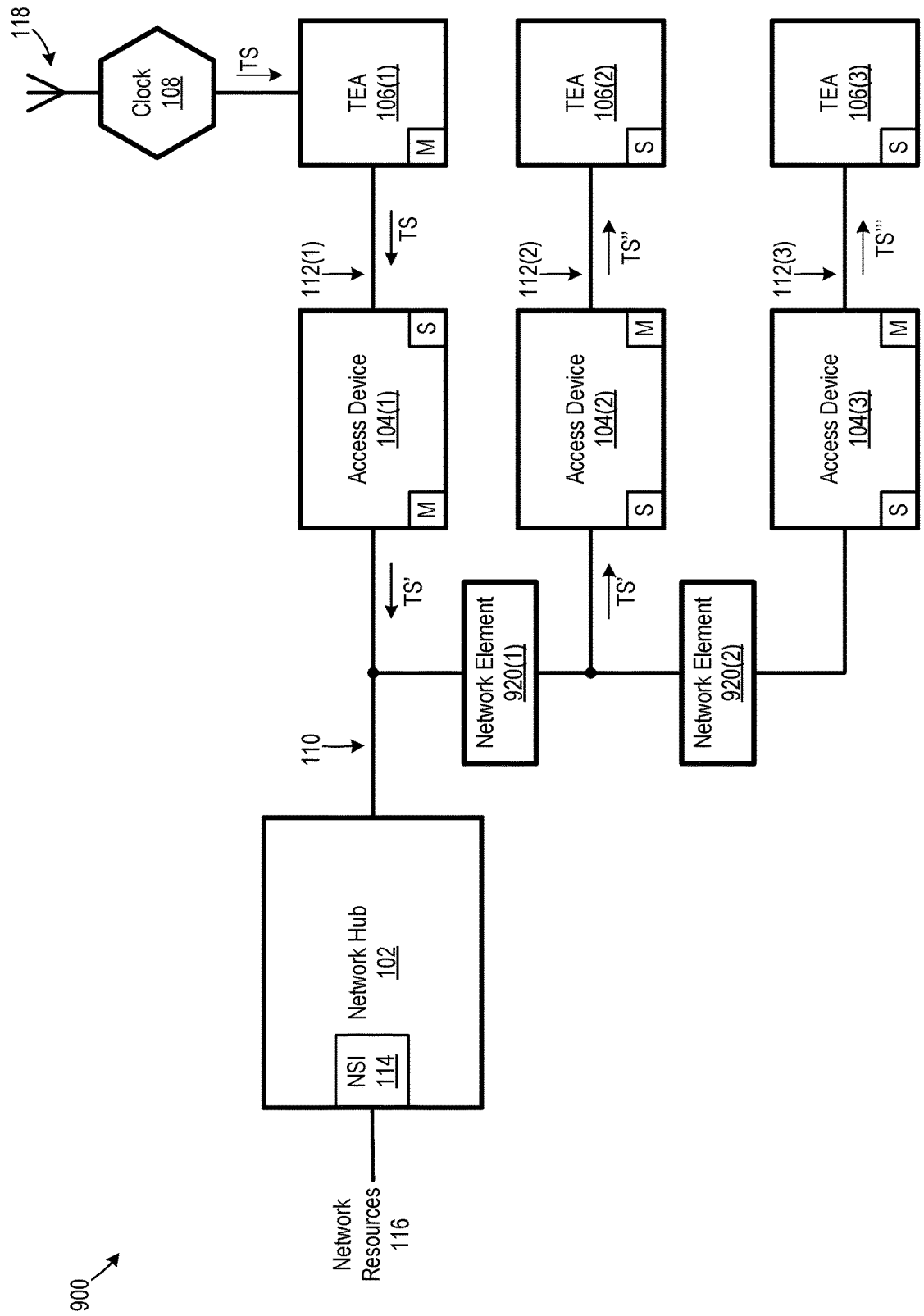
FIG. 9 is a block diagram illustrating another edge communication network including an edge-located clock and additional network elements, according to an embodiment.
Figure 10:
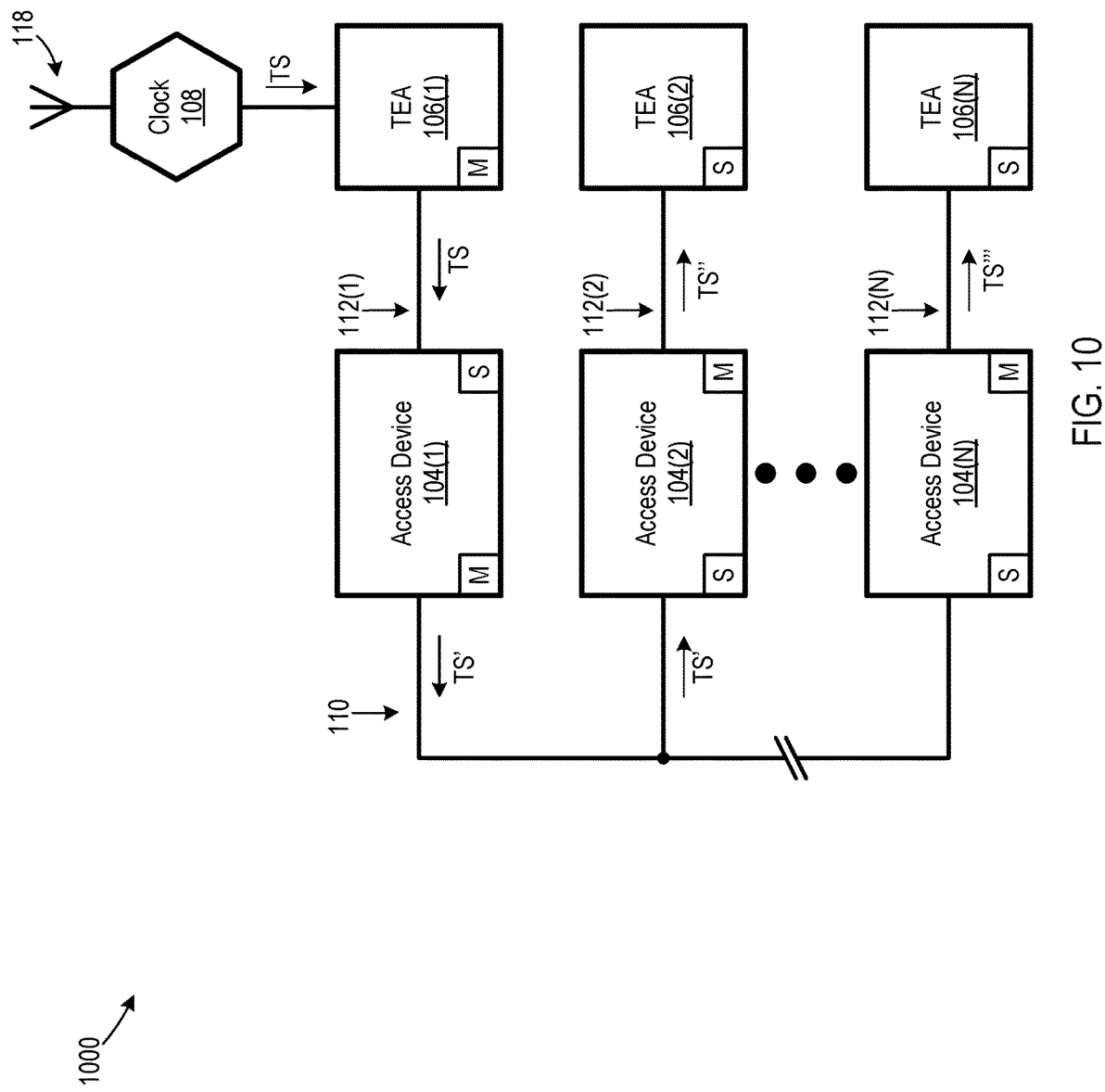
FIG. 10 is a block diagram illustrating another edge communication network including an edge-located clock which operates in a peer-to-peer manner, according to an embodiment.

Communication media 110 includes, for example, optical cable, electrical cable, and/or wireless transmission links. For example, in some embodiments, communication media 110 includes a combination of optical cable and coaxial electrical cable, sometimes referred to as hybrid-fiber-coax (HFC). As another example, in some embodiments, communication media 110 includes coaxial electrical cable, Ethernet optical cable, Ethernet electrical cable, and/or twisted-pair electrical cable. Communication media 110 may additionally include passive and/or active communication devices. For example, in some embodiments where communication media 110 includes HFC, communication media 110 further includes one or more of a fiber node, an amplifier, and a coaxial cable tap. As another example, in some embodiments where communication media 110 includes optical cable, communication media 110 further includes one or more optical splitters. FIG. 9, discussed below, illustrates one example of communication media 110 including additional devices in the form of network elements 920.

Each access device 104 provides a respective TEA 106 access to edge communication network 100. Examples of access devices 104 include, but are not limited to, (a) a cable modem, e.g. operating according to a DOCSIS protocol, (b) an optical network terminal (ONT) or an optical network unit (ONU), e.g. operating according to an EPON, GPON, or RFOG protocol, or (c) a DSL modem. Access devices 104 may provide access to applications in addition to, or other than, TEAs 106, without departing from the scope hereof. For example, in an alternate embodiment, TEA 106(2) is omitted, and access device 104(2) provides access to an alternate application (not shown) communicatively coupled to access device 104(2). Each communication medium 112 includes, for example, (a) an electrical cable, e.g. an Ethernet cable, (b) an optical cable, and/or (c) a wireless communication link.

Figure 2:
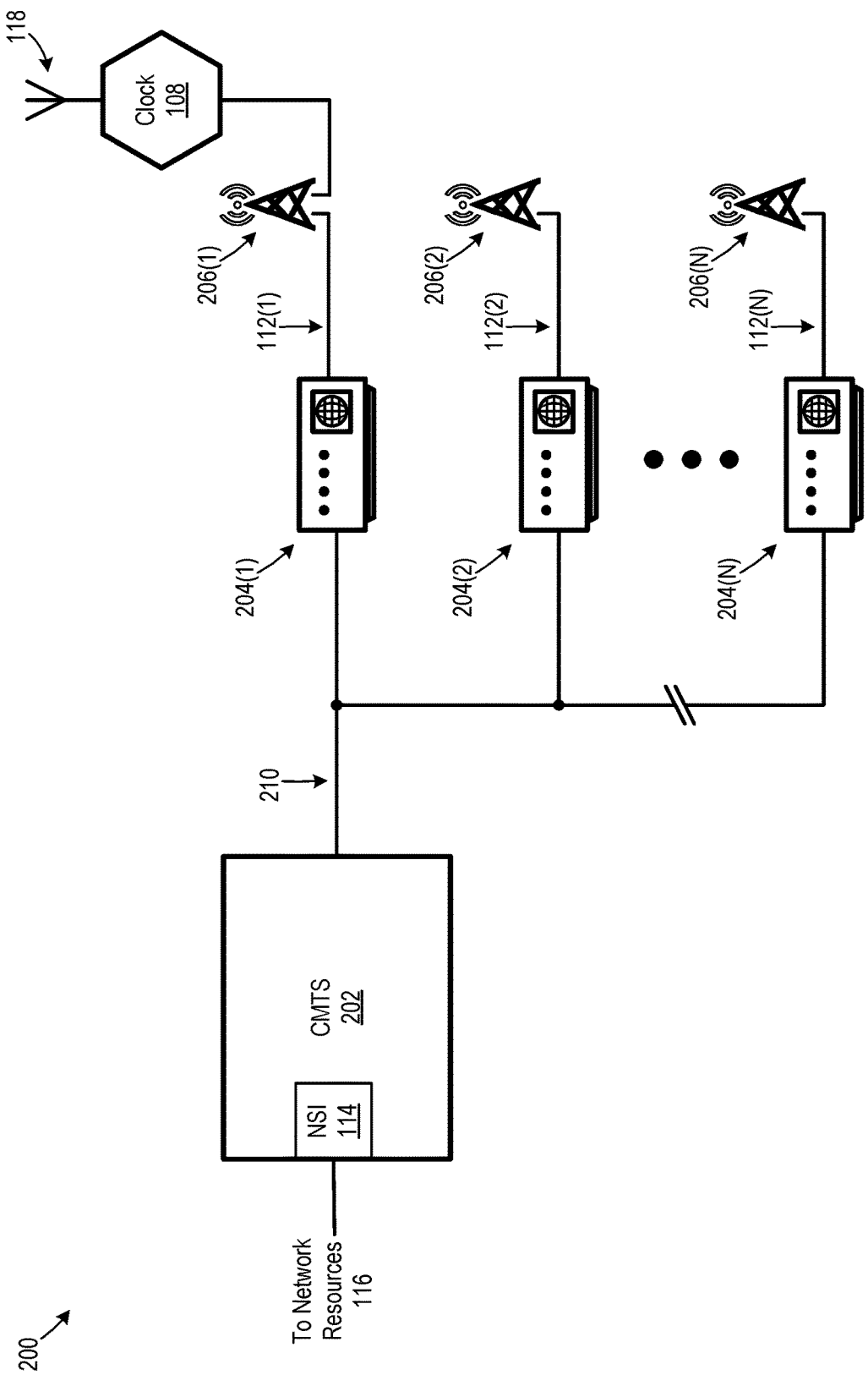
FIG. 2 is a block diagram illustrating an embodiment of the FIG. 1 edge communication network in a cable application.

Each TEA 106 includes an application that uses time stamps for synchronization. In some embodiments, each TEA 106 includes a wireless base station. Examples of such wireless base stations include, but are not limited to, e.g. a long-term evolution (LTE) wireless base station (e.g., an eNB device), a fifth-generation (5G) new radio (NR) wireless base station (e.g., a gNB device), a sixth-generation (6G) wireless base station, a Wi-Fi wireless base station (e.g., including unscheduled, partially scheduled, and scheduled systems), a satellite wireless base station, or variations and/or extensions thereof. In other embodiments, TEA 106 includes a precision gaming device and/or a financial trading station. FIG. 2 is a block diagram of an edge communication network 200, which is an embodiment of edge communication network 100 where (a) network hub 102 is embodied by a CMTS 202 operating according to a DOCSIS protocol, (b) communication media 110 is embodied by coaxial cable or HFC, 210, (c) each access device 104 is embodied by a cable modem 204 operating according to the DOCSIS protocol, and (d) each TEA 106 is embodied by a wireless base station 206. Edge communication network 200 has asymmetrical transit times due to the network operating according to a DOCSIS protocol, i.e. uplink transit time is different than downlink transit time.

Referring again to FIG. 1, clock 108 generates time stamps (TSs) which are used by one or more TEAs 106 for synchronization. Each time stamp TS represents, for example, a current time of day, such as based on coordinated universal time or another time standard. Clock 108 is, for example, a grandmaster clock. In some embodiments, clock 108 includes an antenna device 118 for obtaining time data from a global navigation satellite system (GNSS) source, e.g. by using a global positioning system (GPS). However, clock 108 could be a different type of clock without departing from the scope hereof. For example, in some embodiments, clock 108 is an atomic clock or a quantum clock. Communicatively coupling clock 108 to an edge of communication network 100, i.e. to a TEA 106, instead of to NSI 114, advantageously helps minimize transmission path length and/or devices that time stamps TSs must travel from clock 108 to recipient TEAs 106. Additionally, multiple TEAS 106 can share clock 108, thereby eliminating the need for each TEA 106 to have a respective clock.

Figure 3:
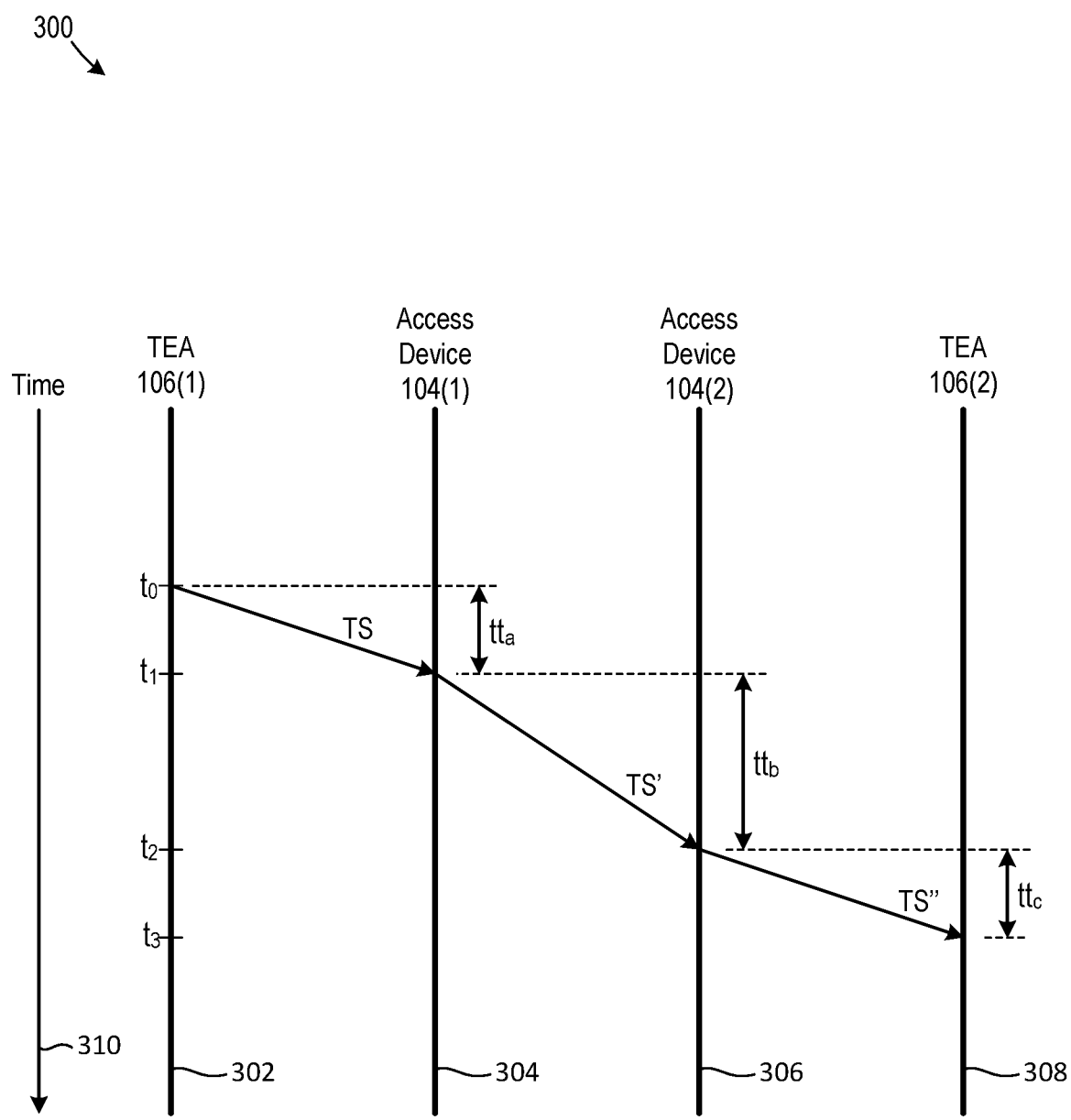
FIG. 3 is a data flow diagram illustrating an example of transmission of a time stamp between two timing end applications of the FIG. 1 edge communication network, according to an embodiment.

FIG. 1 illustrates an example of a time stamp being transmitted from clock 108 to TEA 106(2), and FIG. 3 is a data flow diagram 300 illustrating such transmission. Lines 302, 304, 306, and 308 of FIG. 3 logically represent TEA 106(1), access device 104(1), access device 104(2), and TEA 106(2), respectively. Additionally, vertical axis 310 in FIG. 3 represents time. At time to, clock 108 generates time stamp TS at TEA 106(1), as shown in FIG. 3. TEA 106(1) transmits time stamp TS to access device 104 using communication medium 112(1), e.g. via a PTP message where TEA 106(1) is a master (M) clock and access device 104(1) is a slave (S) clock with respect to time stamp TS. Time stamp TS arrives at access device 104(1) at time $t_1$, such that a transit time between TEA 106(1) and access device 104(1) is $tt_a$. Access device 104(1) adjusts time stamp TS to account for transit time $tt_a$, such as by adding an offset representing transit time $tt_a$ to time stamp TS. This adjusted time stamp is referred to as time stamp TS'. Access device 104(1) optionally informs network hub 102 that access device 104(1) is a slave clock with respect to TEA 106(1).

Access device 104(1) transmits time stamp TS' to access device 104(2) via communication media 110, e.g. by generating a message on communication media 110 including time stamp TS'. The message is, for example, a PTP message and/or a DTP message. Access device 104(1) is a master clock and access device 104(2) is a slave clock with respect to time stamp TS'. Time stamp TS' arrives at access device 104(2) at time $t_2$, such that time stamp Ts' has a transit time of $tt_b$, as shown in FIG. 3. In some embodiments, communication media 110 directly transmits time stamp TS' from access device 104(1) to access device 104(2), e.g. in a peer-to-peer fashion. In some other embodiments, network hub 102 relays time stamp TS' from access device 104(1) to access device 104(2), and in these embodiments, network hub 102 optionally adjusts time stamp TS' to account for transit time from access device 104(1) to network hub 102.

Access device 104(2) adjusts time stamp TS' to at least partially account for transit time between access device 104(1) to access device 104(2). In embodiments where time stamp TS' travels between access devices 104(1) and 104(2) without being processed by network hub 102, or in embodiments where time stamp TS' travels through network hub 102 but network hub 102 does not adjust time stamp TS', access device 104(2) adjusts time stamp TS' to account for the entire transit time between access devices 104(1) and 104(2). For example, in some embodiments, access device 104(2) adds an offset representing transit time $tt_b$ to time stamp TS', to adjust time stamp TS'. In embodiments where network hub 102 adjusts TS' to account for transit time from access device 104(1) to network hub 102, access device 104(2) adjusts time stamp TS' to account for transit time from network hub 102 to access device 104(2). Time stamp TS' as adjusted by access device 104(2) is referred to as time stamp TS''.

In some embodiments where edge communication network 100 has asymmetric transit time, TS'' is determined according to following process, which is performed by access device 104(2) and/or by network hub 102. First, adjustment times t-adj(1) and t-adj(2) are obtained, where (a) t-adj(1) accounts for asymmetrical transit time between network hub 102 and access device 104(1), and (b) t-adj(2) accounts for asymmetrical transit time between network hub 102 and access device 104(2). Adjustment time t-adj(1) is the NSI to customer premises equipment (CPE) delay of access device 104(1). Adjustment time t-adj(1) may include an internal path delay of network hub 102 and access device 104(1) and path delay between network hub 102 and access device 104(1). The internal path delay of network hub 102 and access device 104(1) are known and are supplied by each equipment supplier, for example. In case an optional network element exists between network hub 102 and access device 104(1), path delay traversing the network element is also included. Second, an offset time Δt-adj is determined according to EQN. 1 as follows:

$$\Delta t\text{-}adj(1,2) = t\text{-}adj(1) - t\text{-}adj(2) \quad \text{(EQN. 1)}$$

Third, TS'' is determined from EQN. 2 as follows, where A is a compensation factor to account for additional factors affecting transit time. In some embodiments, A is zero.

$$TS'' = \Delta t\text{-}adj(1,2) + TS' + \Delta \quad \text{(EQN. 2)}$$

Figure 4:
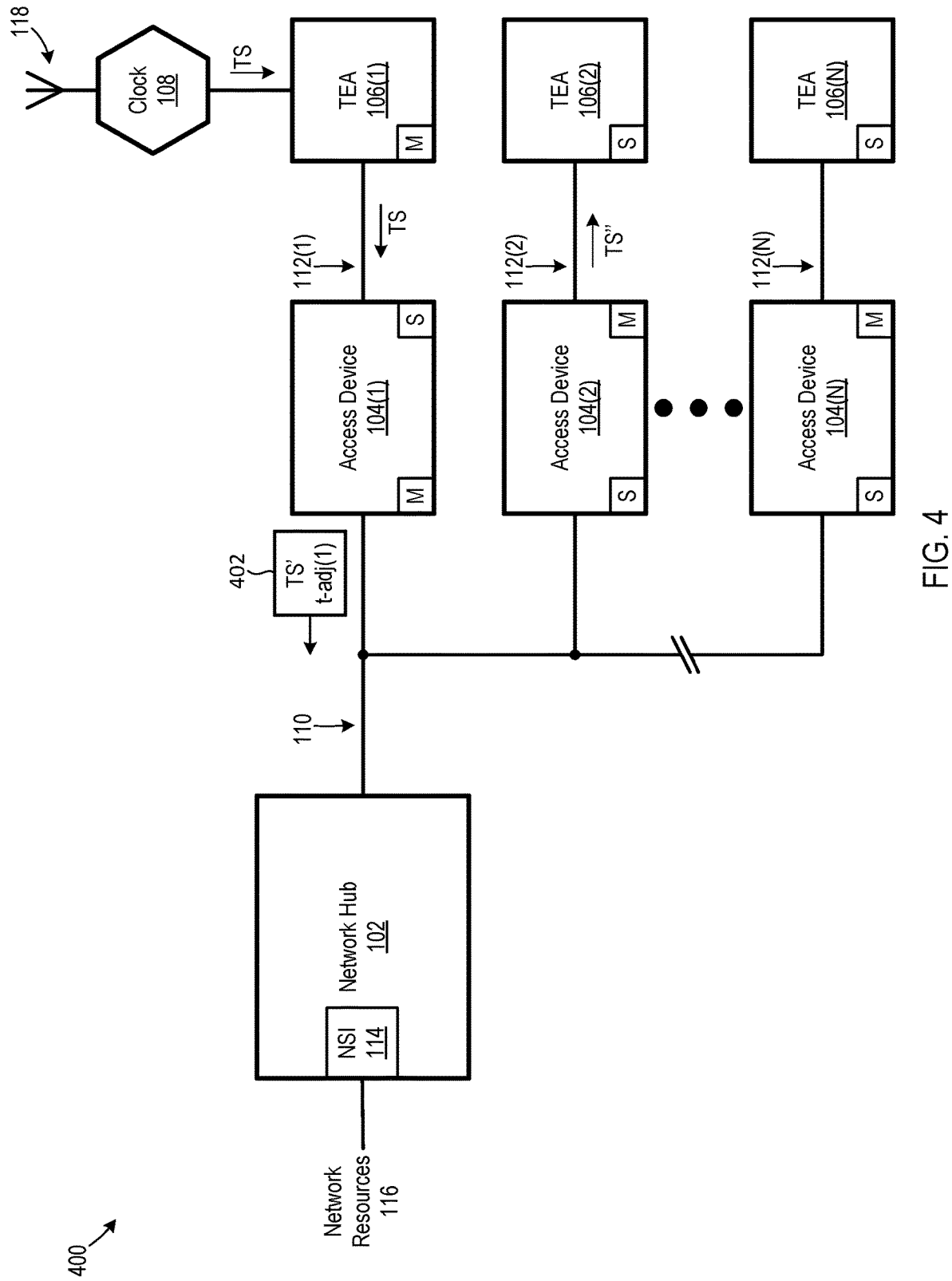
FIG. 4 is a block diagram of an embodiment of the FIG. 1 edge communication network where an access device is configured to generate a message including both a time stamp and an adjustment time.

In some embodiments, access devices 104 are configured to transmit messages including both time stamps and adjustment times. For example, FIG. 4 is a block diagram of an edge communication network 400, which is an embodiment of edge communication network 100 where access device 104(1) is configured to generate a message 402 on communication media 100 for transmission to access device 104(2), where message 402 includes time stamp TS' and adjustment time t-adj(1). In some embodiments, access device 104(1) determines adjustment time t-adj(1), e.g. by using a ranging procedure, while in some other embodiments, access device 104(1) receives adjustment time t-adj(1) from network hub 102. Message 402 is, for example, a PTP message or a DTP message. Message 402 could include a different and/or additional adjustment time without departing from the scope hereof.

Figure 5:
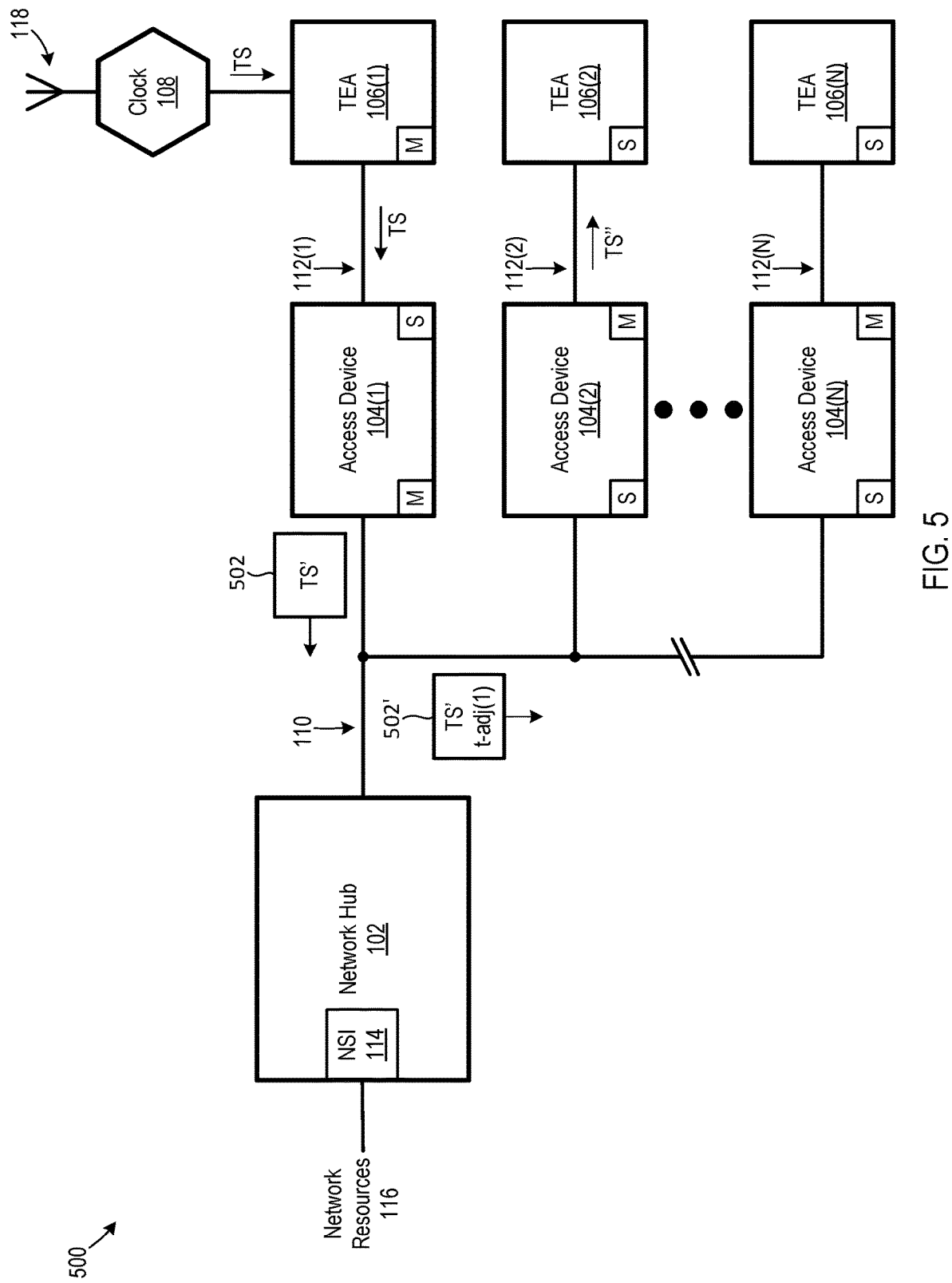
FIG. 5 is a block diagram of an embodiment of the FIG. 1 edge communication network where a network hub is configured to append an adjustment time to a message including a time stamp.

In some other embodiments, access devices 104 are configured to transmit messages including time stamps, and network hub 102 is configured to append adjustment times to the messages. For example, FIG. 5 is a block diagram of an edge communication network 500, which is an embodiment of edge communication network 100 where access device 104(1) is configured to generate a message 502 on communication media 100 for transmission to access device 104(2), where message 502 includes time stamp TS'. Additionally, in this embodiment, network hub 102 is configured to append adjustment time t-adj(1) to message 502 before the message reaches access device 104(2). Appended message 502 is represented by 502' in FIG. 5. Messages 502 and 502' are, for example, PTP messages or DTP messages.

Figure 6:
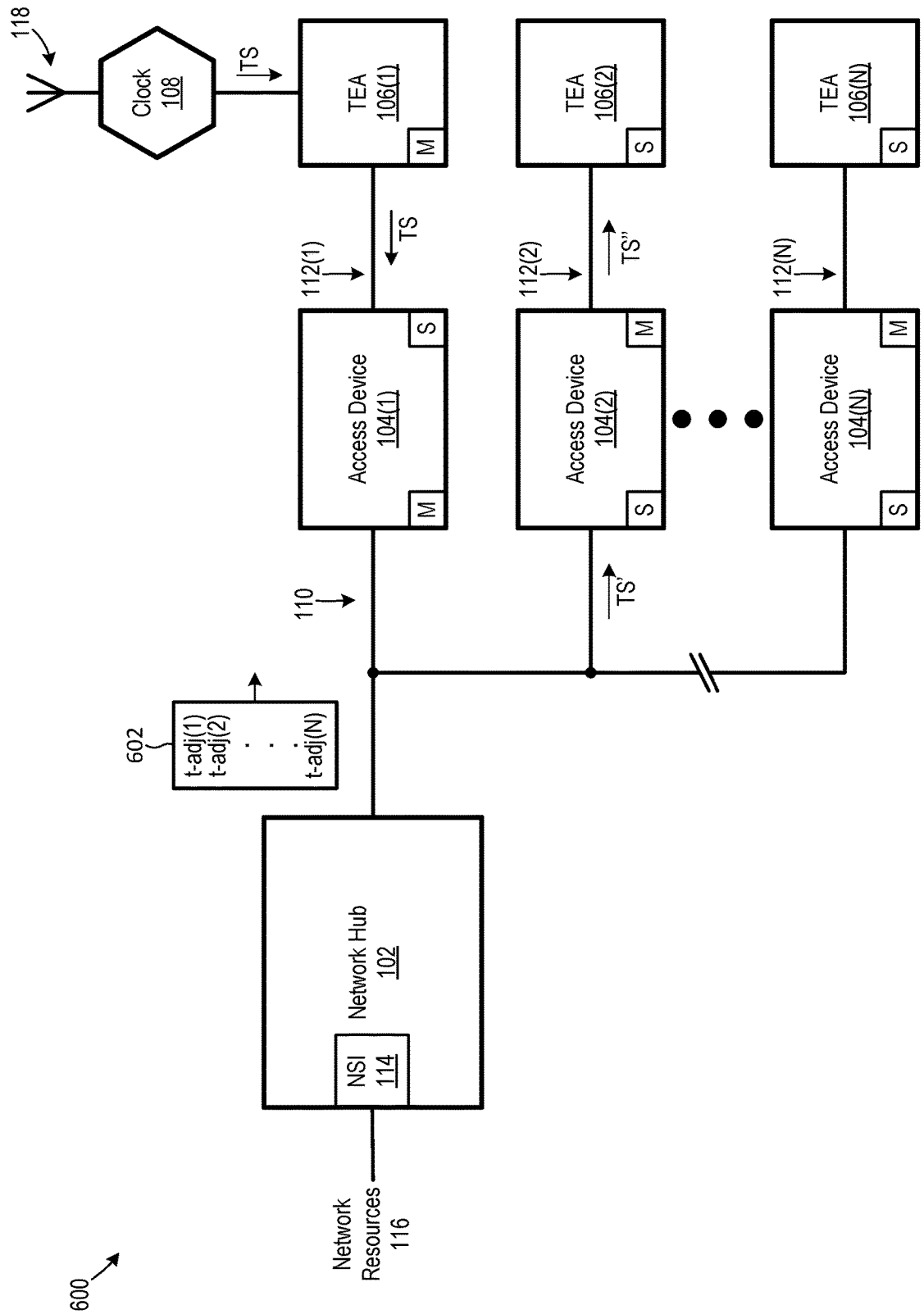
FIG. 6 is a block diagram of the FIG. 1 edge communication network where a network hub is configured to transmit a message to each access device 104, where the message includes a respective adjustment time for each access device of the network.

In yet other embodiments, network hub 102 is configured to transmit adjustment times to access devices 104 separately from messages including time stamps. For example, FIG. 6 is a block diagram of an edge communication network 600, which is an embodiment of edge communication network 100 where network hub 102 is configured to transmit a message 602 to each access device 104, where message 602 includes a respective adjustment time for each access device 104. The number and type of adjustment time messages included in message 602 could vary without departing from the scope hereof.

Referring again to FIG. 1, access device 104(2) transmits time stamp TS'' to TEA 106(2) via communication medium 112(2), where access device 104(2) is a master clock and TEA 106(2) is a slave clock with respect to time stamp TS''. Time stamp TS'' arrives at TEA 106(2) at time $t_3$ (FIG. 3), such that time stamp TS'' has a transit time of $tt_c$. TEA 106(2) adjusts time stamp TS'' to account for transit time $tt_c$, and TEA 106(2) uses the adjusted time stamp for synchronization, such as to synchronize TEA 106(2) with TEA 106(1).

Time stamp TS may be transmitted from TEA 106(1) to other TEAs 106 in manner similar to how time stamp TS is transmitted from TEA 106(1) to TEA 106(2). For example, FIG. 7 is a flow diagram 700 illustrating transmission of time stamp TS from TEA 106(1) to TEA 106(N).

Figure 7:
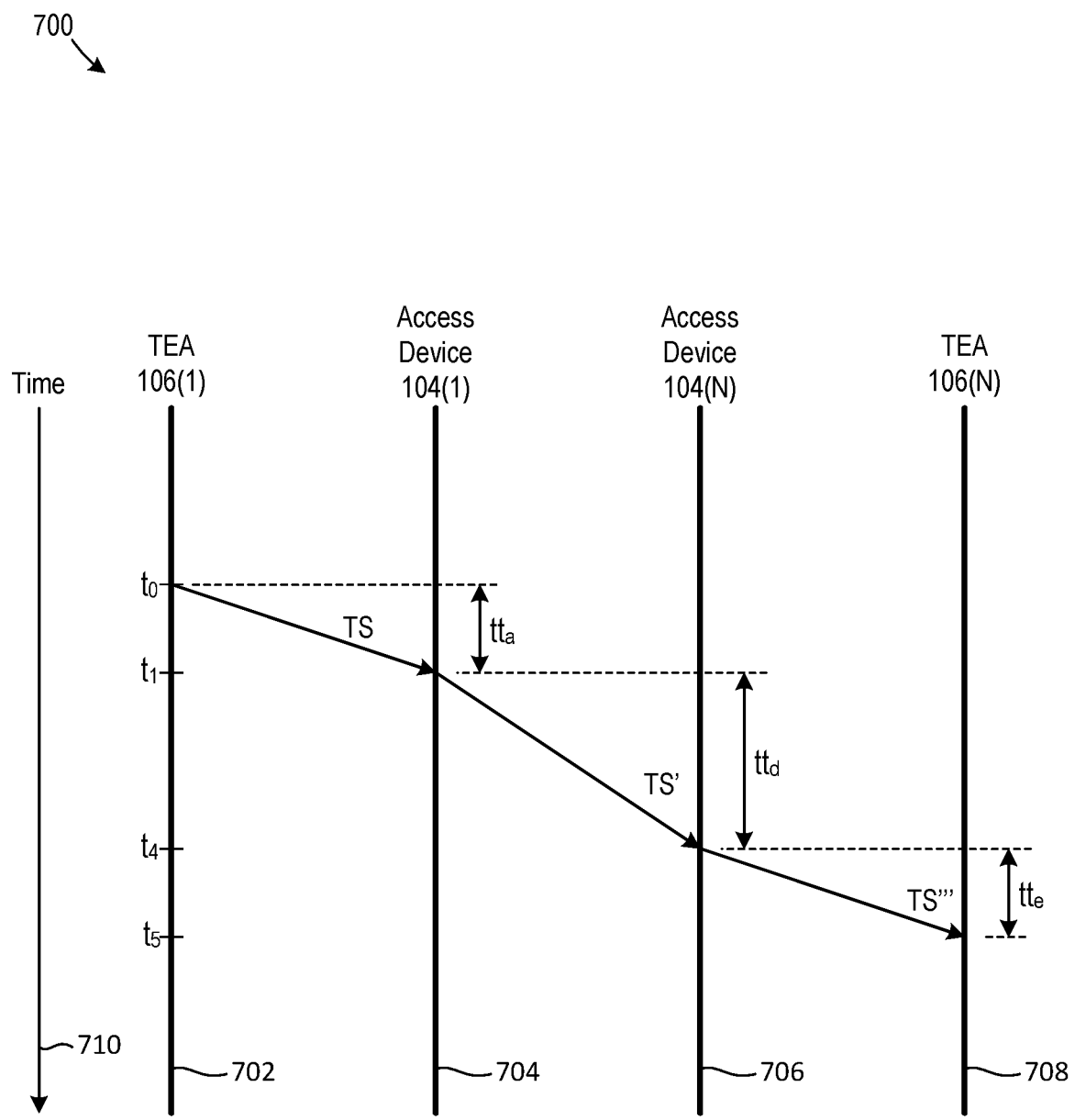
FIG. 7 is a data flow diagram illustrating another example of transmission of a time stamp between two timing end applications of the FIG. 1 edge communication network, according to an embodiment.

Lines 702, 704, 706, and 708 of FIG. 7 logically represent TEA 106(1), access device 104(1), access device 104(N), and TEA 106(N), respectively. Additionally, vertical axis 710 in FIG. 7 represents time. At time $t_0$, clock 108 generates time stamp TS at TEA 106(1), as shown in FIG. 7. TEA 106(1) transmits time stamp TS to access device 104, e.g. via a PTP message. Time stamp TS arrives at access device 104(1) at time $t_1$, such that a transit time between TEA 106(1) and access device 104(1) is $tt_a$. Access device 104(1) adjusts time TS to account for transit time $tt_a$, such as by adding an offset representing transit time $tt_a$ to time stamp TS. This adjusted time stamp is referred to as time stamp TS'. Access device 104(1) optionally informs network hub 102 that access device 104(1) is a slave clock with respect to TEA 106(1).

Access device 104(1) transmits time stamp TS' to access device 104(N) via communication media 110, e.g. by generating a message on communication media 110 including time stamp TS'. The message is, for example, a PTP message and/or a DTP message. Time stamp TS' arrives at access device 104(N) at time $t_4$, such that time stamp Ts' has a transit time of $tt_d$, as shown in FIG. 7. Access device 104(N) adjusts time stamp TS' to at least partially account for transit time between access device 104(1) to access device 104(N). Time stamp TS' as adjusted by access device 104(N) is referred to as time stamp TS'''. Access device 104(N) transmits time stamp TS''' to TEA 106(N) via communication medium 112(N). Time stamp TS''' arrives at TEA 106(N) at time $t_5$, such that time stamp TS''' has a transit time of $tt_e$. TEA 106(N) adjusts time stamp TS''' to account for transit time $tt_e$, and TEA 106(N) uses the adjusted time stamp for synchronization, such as to synchronize TEA 106(N) with TEA 106(1).

Figure 8:
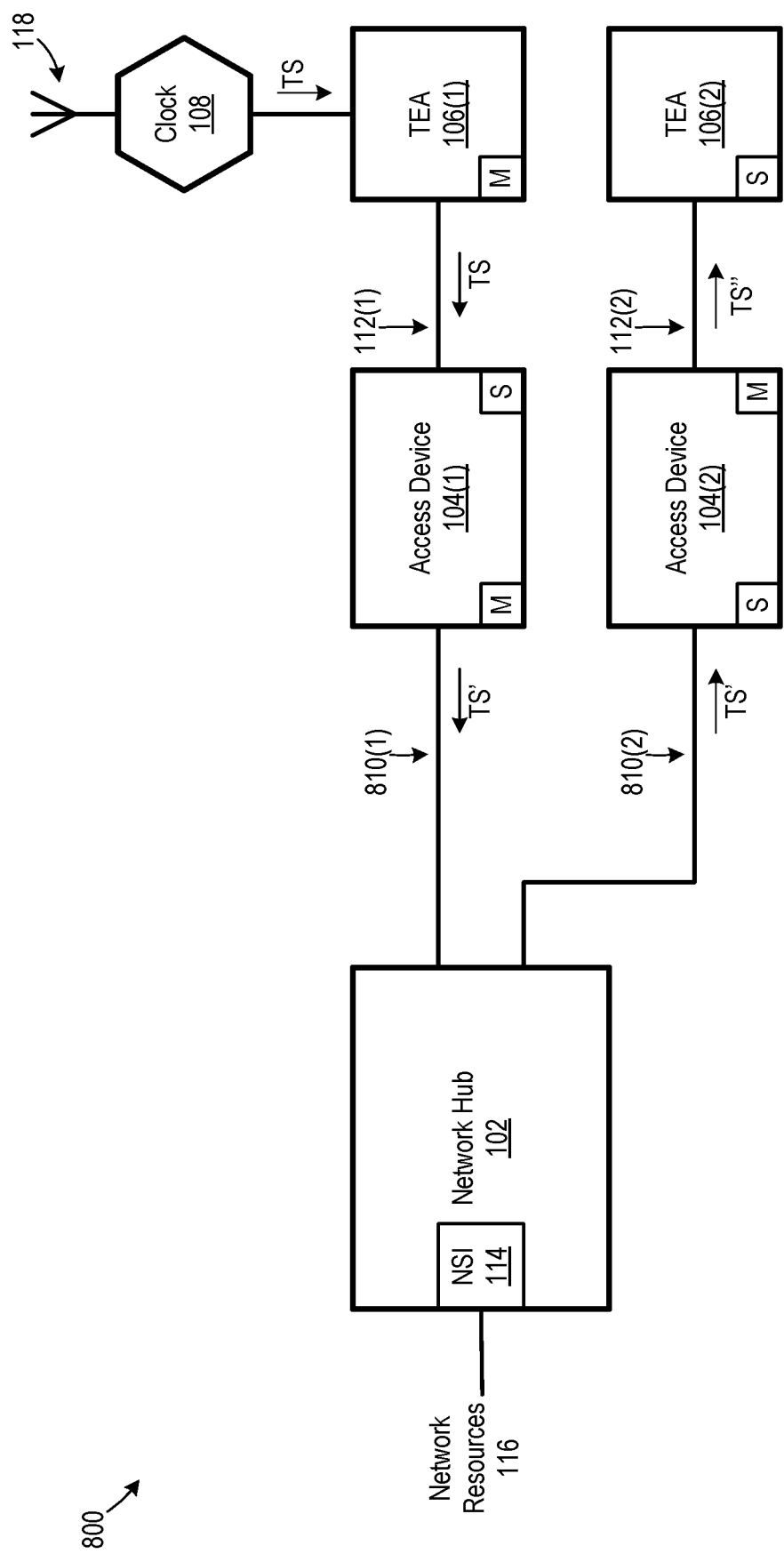
FIG. 8 is a block diagram illustrating another edge communication network including an edge-located clock, according to an embodiment.

Although FIG. 1 illustrates all access devices 104 being coupled to a common communication media 110, edge communication network 100 could have other topologies without departing from the scope hereof. For example, FIG. 8 is a block diagram illustrating an edge communication network 800, which is similar to edge communication network 100 but with communication media 110 replaced by communication mediums 810(1) and 810(2). Communication medium 810(1) communicatively couples network hub 102 with access device 104(1), and communication medium 810(2) communicatively couples network hub 102 with access device 104(2). Each communication medium 810 is, for example, optical cable, electrical cable, and/or wireless transmission links. For example, in some embodiments, each communication medium 810 is HFC leg of a cable system or a leg of a passive optical network system. Each communication medium 810 may additionally include passive and/or active communication devices. For example, in some embodiments where communication mediums 810(1) and 810(2) include HFC, each communication medium 810 may further include one or more of a fiber node, an amplifier, and a coaxial cable tap. As another example, in some embodiments where each communication medium 810 includes optical cable, each communication medium 810 may further include one or more optical splitters. As yet another example, in some embodiments, each communication medium 810 may include Ethernet communication medium, such as an Ethernet electrical cable, and Ethernet optical cable, or an Ethernet wireless link.

Edge communication network 800 could include one more access devices 104 communicatively coupled to communication medium 810(1) and/or 810(2) without departing from the scope hereof. Additionally, edge communication network 800 could include additional communication mediums 810 with one or more access devices 104 communicatively coupled thereto without departing from the scope hereof.

Time stamps are transmitted between TEAs in edge communication network 800 in a manner similar to that discussed above with respect edge communication network 100. However, time stamps between TEAs 106 communicatively coupled to different respective communication mediums 810 are necessarily transmitted through network hub 102. For example, time stamp TS' transmitted from access device 104(1) to access device 104(2) is transmitted through network hub 102.

FIG. 9 is a block diagram illustrating an edge communication network 900, which is similar to edge communication network 100 but further includes network elements 920 in communication media 110 between access devices 104. Some examples of network elements 920 include, but are not limited to, fiber nodes, amplifiers, repeaters, coaxial cable taps, and optical splitters. Each network element 920 need not necessarily have the same configuration. For example, in one embodiment, network element 920(1) is a fiber node and network element 920(2) is an amplifier. Edge communication network 900 could include additional access devices 104 and/or additional network elements 920 without departing from the scope hereof.

In certain embodiments where edge communication network 900 has asymmetric transit time, time stamp TS" is determined according to the process discussed above with respect to FIG. 1, e.g. using EQNS. 1 and 2. In some embodiments, time stamp TS''', which is transmitted from access device 104(3) to TEA 106(3), is determined by access device 104(3) and/or by network hub 102 using EQNS. 3 and 4 below. In EQN. 3, t-adj(3) accounts for asymmetrical transit time between network hub 102 and access device 104(3), including delay associated with network element 920(2).

$$\Delta t\text{-}adj(2,3) = t\text{-}adj(2) - t\text{-}adj(3) \quad \text{(EQN. 3)}$$

$$TS''' = \Delta t\text{-}adj(1,2) - \Delta t\text{-}adj(2,3) + TS' + \Delta \quad \text{(EQN. 4)}$$

FIG. 1000 is a block diagram illustrating an edge communication network 1000, which is similar to edge communication network 100 but with network hub 102 omitted. Accordingly, access devices 104 communicate with other via communication media 110 in a peer-to-peer manner, in edge communication network 1000. Time stamps are determined, for example, using a process similar to that discussed above with respect to FIG. 1, e.g. using EQNS. 1 and 2.

Edge communication networks 100, 200, 400, 500, 600, 800, 900, and 1000 could include one or more additional clocks without departing from the scope hereof. For example, edge communication networks 100, 200, 400, 500, 600, 800, 900, and 1000 could include an additional clock communicatively coupled to TEA 106(2), such as to provide synchronization redundancy in the event of failure of clock 108, TEA 106(1), and/or access device 104(1). As another example, edge communication networks 100, 200, 400, 500, 600, 800, 900, and 1000 could include a clock communicatively coupled to NSI 114, such as purposes other than synchronization of TEAs 106.

Figure 11:
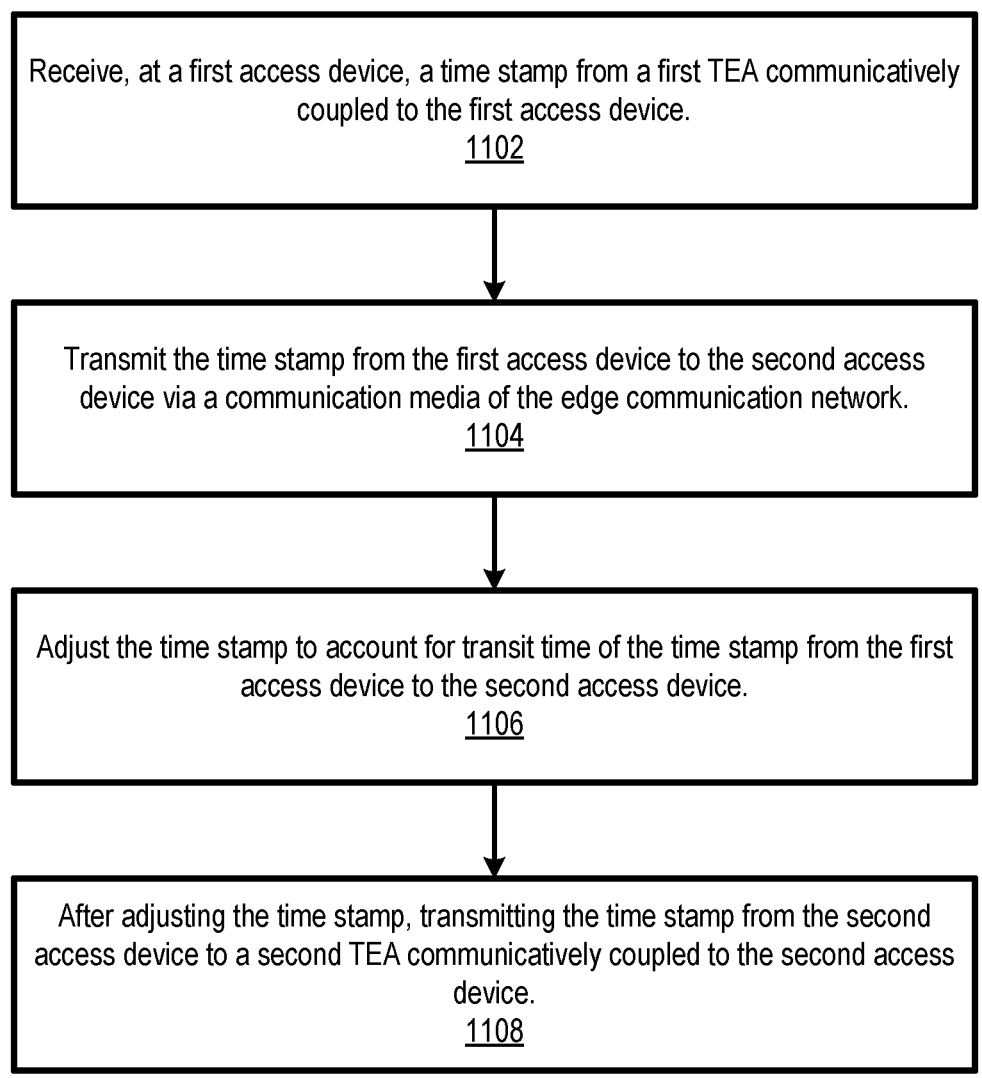
FIG. 11 is a flow chart illustrating a method for synchronizing a timing end application in an edge communication network, according to an embodiment.

FIG. 11 is a flow chart illustrating a method 1100 for synchronizing a timing end application in an edge communication network. In a block 1102, a time stamp is received at a first access device from a first TEA communicatively coupled to the first access device. In one example of block 1102, access device 104(1) receives time stamp TS from TEA 106(1), and access device 104(1) adjusts time stamp TS to yield time stamp TS'. In a block 1104, the time stamp is transmitted from the first access device to a second access device via communication media of the edge communication network. In one example of block 1104, time stamp TS' is transmitted from access device 104(1) to access device 104(2). In a block 1106, the time step is adjusted to account for transit time of the time stamp from the first access device to the second access device. In one example of block 1106, access device 104(2) and/or network hub 102 adjust time stamp TS' to yield time stamp TS", to account for transit time of the time stamp from the first access device to the second access device. In a block 1108, the time stamp is transmitted from the second access device to a second TEA communicatively coupled to the second access device, after the time stamp is adjusted. In one example of block 1108, time stamp TS" is transmitted from access device 104(2) to TEA 106(2).

Figure 12:
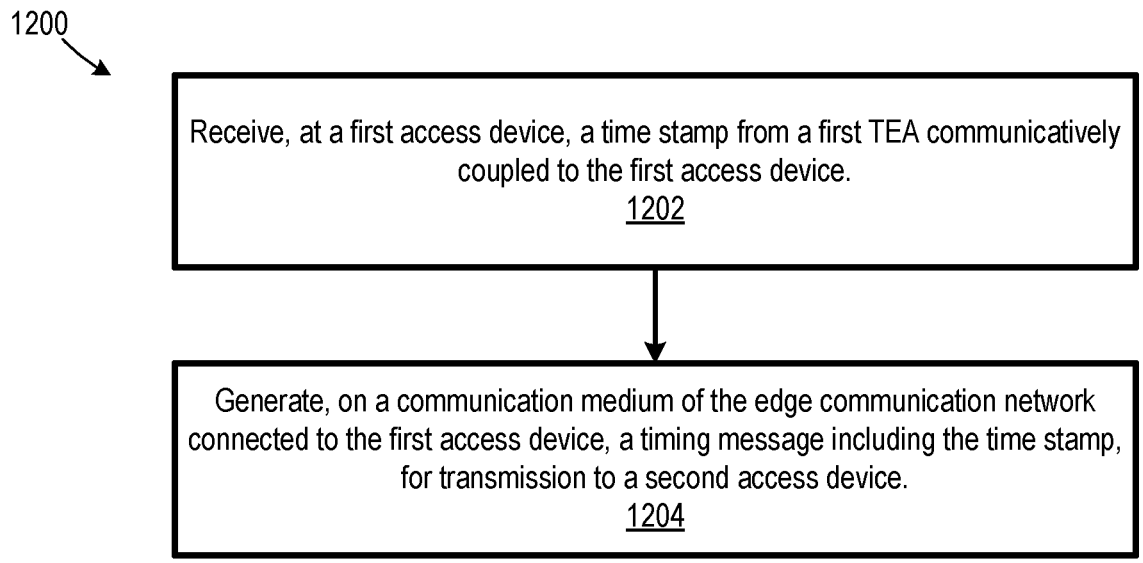
FIG. 12 is a flow chart illustrating another method for synchronizing a timing end application in an edge communication network, according to an embodiment.

FIG. 12 is a flow chart illustrating a method 1200 for synchronizing a timing end application in an edge communication network. In a block 1202, a time stamp is received at a first access device from a first TEA communicatively coupled to the first access device. In one example of block 1202, access device 104(1) receives time stamp TS from TEA 106(1). In a block 1204, a timing message is generated on a communication medium of the edge communication network connected to the first access device for transmission to a second access device, where the timing message includes the time stamp. In one example of block 1204, access device 104(1) generates time stamp TS' on communication media 110.

Figure 13:
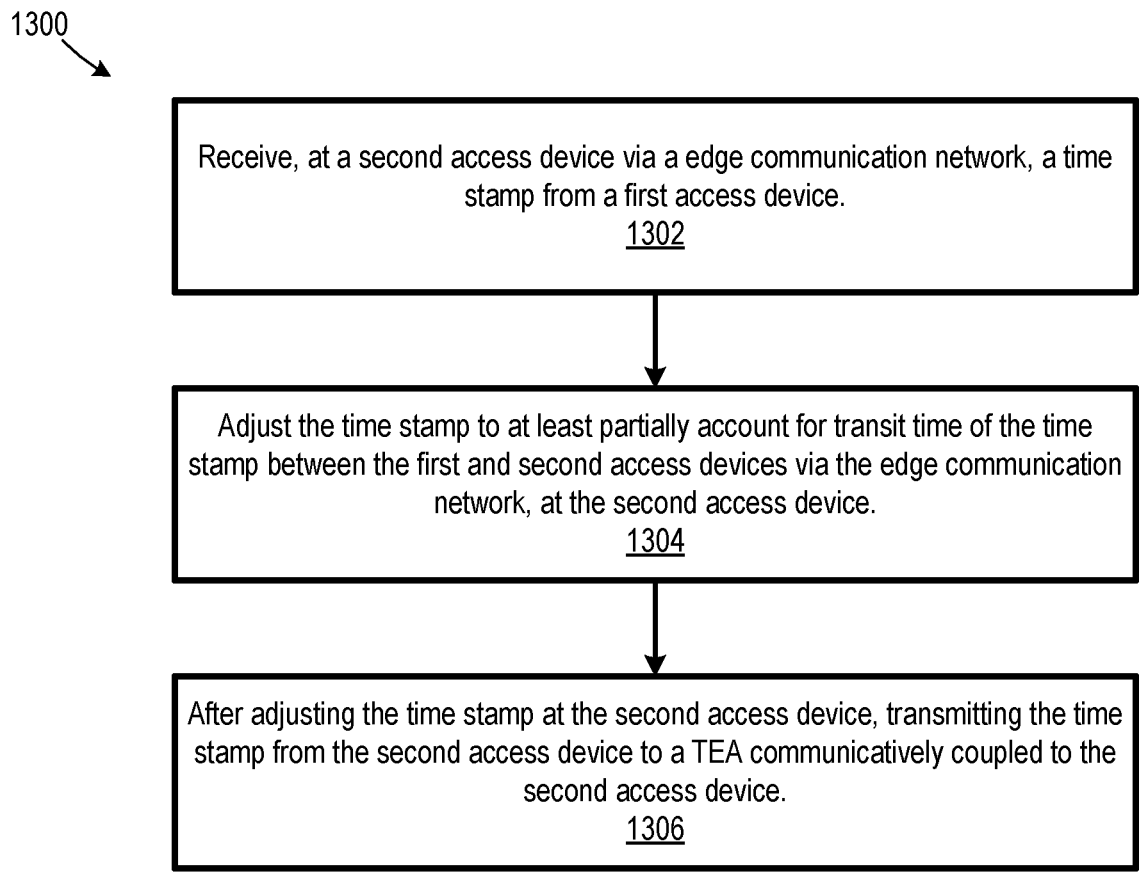
FIG. 13 is a flow chart illustrating another method for synchronizing a timing end application in an edge communication network, according to an embodiment.

FIG. 13 is a flow chart illustrating a method 1300 for synchronizing a timing end application in an edge communication network. In a block 1302, a time stamp is received by a second access device of an edge communication network from a first access device of the edge communication network. In one example of block 1302, access device 104(2) receives time stamp TS' from access device 104(1). In a block 1304, the time stamp is adjusted, at the second access device, to at least partially account for transit time between the first and second access devices via the edge communication network. In one example of block 1304, access device 104(2) adjusts time stamp TS' to yield time stamp TS". In a block 1306, the time stamp is transmitted from the second access device to a TEA communicatively coupled to the second access device, after adjusting the time stamp at the second access device. In one example of block 1306, time stamp TS" is transmitted from access device 104(2) to TEA 106(2).

Combinations of Features:

Features described above may be combined in various ways without departing from the scope hereof. The following examples illustrate some possible combinations:

(A1) A method for synchronizing a timing end application (TEA) in an edge communication network may include (1) receiving, at a first access device, a time stamp from a first TEA communicatively coupled to the first access device, (2) transmitting the time stamp from the first access device to a second access device via communication media of the edge communication network, (3) adjusting the time stamp to account for transit time of the time stamp from the first access device to the second access device, and (4) after adjusting the time stamp, transmitting the time stamp from the second access device to a second TEA communicatively coupled to the second access device.

(A2) In the method denoted as (A1), the edge communication network may have asymmetrical transit times.

(A3) In any one of the methods denoted as (A1) and (A2), transmitting the time stamp from the first access device to the second access device via the edge communication network may include transmitting the time stamp via a common communication medium of the edge communication network shared by each of the first access device and the second access device.

(A4) In any one of the methods denoted as (A1) through (A3), transmitting the time stamp from the first access device to the second access device via the edge communication network may include relaying the time stamp at a network hub of the edge communication network.

(A5) In any one of the methods denoted as (A1) through (A4), adjusting the time stamp to account for transit time of the time stamp from the first access device to the second access device may include (1) determining an offset time from a difference between a first adjustment time and a second adjustment time, the first adjustment time being based on a transit time between the first access device and a network hub of the edge communication network, and the second adjustment time being based on transit time between the network hub and the second access device, and (2) adjusting the time stamp according to the offset time.

(A6) The method denoted as (A5) may further include transmitting the first adjustment time to the second access device via a message including the time stamp.

(A7) The method denoted as (A5) may further include transmitting the first adjustment time to the second access device via a message from the network hub to the second access device.

(A8) In any one of the methods denoted as (A1) through (A7), (1) the first access device may include a first cable modem, (2) the second access device may include a second cable modem, and (3) the edge communication network may include coaxial electrical cable.

(A9) In any one of the methods denoted as (A1) through (A8), the second TEA may include a wireless base station.

(B1) A method for synchronizing a timing end application (TEA) in an edge communication network may include (1) receiving, at a first access device, a time stamp from a first TEA communicatively coupled to the first access device, and (2) generating, on a communication medium of the edge communication network connected to the first access device, a message including the time stamp, for transmission to a second access device via the edge communication network.

(B2) The method denoted as (B1) may further include (1) determining a first adjustment time from a transit time between the first access device and a network hub of the edge communication network and (2) including the first adjustment time in the message.

(B3) In any one the methods denoted as (B1) and (B2), receiving the time stamp at the first access device comprises receiving the time stamp via a Precision Time Protocol (PTP) message from the first TEA.

(B4) In any one of the methods denoted as (B1) through (B3), the first access device may include a cable modem and (2) the edge communication network may include coaxial electrical cable.

(C1) A method for synchronizing a timing end application (TEA) in an edge communication network may include (1) receiving, at a second access device via the edge communication network, a time stamp from a first access device, (2) adjusting, at the second access device, the time stamp to at least partially account for transit time between the first and second access devices via the edge communication network, and (3) after adjusting the time stamp at the second access device, transmitting the time stamp from the second access device to a TEA communicatively coupled to the second access device.

(C2) In the method denoted as (C1), transmitting the time stamp from the second access device to the TEA may include transmitting the time stamp via a Precision Time Protocol (PTP) message from the second access device to the TEA.

(C3) In any one of the methods denoted as (C1) and (C2), adjusting the time stamp to account for transit time between the first and second access devices via the edge communication network may include (1) determining an offset time from a sum of a first adjustment time and a second adjustment time, the first adjustment time being based on a transit time between the first access device and a network hub of the edge communication network, and the second adjustment time being based on a transit time between the network hub and the second access device, and (2) adding the offset time to the time stamp.

(C4) The method denoted as (C3) may further include receiving the first adjustment time at the second access device from a message including the time stamp and first adjustment time.

(C5) The method denoted as (C3) may further include receiving the first adjustment time from a message received from the network hub.

(C6) In any one of the methods denoted as (C1) through (C5), the second access device may include a cable modem, and the edge communication network may include coaxial electrical cable.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for synchronizing a timing end application (TEA) in an edge communication network, comprising:
   receiving, at a first access device, a time stamp from a first TEA communicatively coupled to the first access device;
   transmitting the time stamp from the first access device to a second access device via a network hub of the edge communication network;
   adjusting the time stamp to account for transit time of the time stamp from the first access device to the second access device via the network hub; and
   after adjusting the time stamp, transmitting the time stamp from the second access device to a second TEA communicatively coupled to the second access device.

2. The method of claim 1, wherein the edge communication network has asymmetrical transit times.

3. The method of claim 1, wherein:
   the first access device is communicatively coupled to the network hub via a first communication medium; and
   the second access device is communicatively coupled to the network hub via a second communication medium that is different from the first communication medium.

4. The method of claim 3, wherein the first communication medium comprises a plurality of elements.

5. The method of claim 3, wherein the second communication medium comprises a plurality of elements.

6. The method of claim 1, wherein adjusting the time stamp to account for transit time of the time stamp from the first access device to the second access device comprises:
   determining an offset time from a difference between a first adjustment time and a second adjustment time, the first adjustment time being based on a transit time between the first access device and the network hub, and the second adjustment time being based on transit time between the network hub and the second access device; and
   adjusting the time stamp according to the offset time.

7. The method of claim 6, further comprising transmitting the first adjustment time to the second access device via a message including the time stamp.

8. The method of claim 6, further comprising transmitting the first adjustment time to the second access device via a message from the network hub to the second access device.

9. The method of claim 1, wherein:
   the first access device comprises a first cable modem;
   the second access device comprises a second cable modem; and
   the edge communication network includes coaxial electrical cable.

10. The method of claim 1, wherein the second TEA comprises a wireless base station.

11. The method of claim 1, wherein:
   the first access device comprises a first optical network terminal (ONT);
   the second access device comprises a second ONT; and
   the edge communication network includes optical cable.

12. The method of claim 1, wherein:
   the first access device is communicatively coupled to the network hub at least partially via a first wireless communication link; and
   the second access device is communicatively coupled to the network hub at least partially via a second wireless communication link that is different from the first wireless communication link.

13. A method for synchronizing a timing end application (TEA) in an edge communication network, comprising:
   receiving, at a first access device, a time stamp from a first TEA communicatively coupled to the first access device, and
   generating, on a communication medium of the edge communication network communicatively coupling the first access device to a network hub of the edge communication network, a message including the time stamp, for transmission to a second access device via the network hub.

14. The method of claim 13, further comprising:
   determining a first adjustment time from a transit time between the first access device and the network hub; and
   including the first adjustment time in the message.

15. The method of claim 13, wherein receiving the time stamp at the first access device comprises receiving the time stamp via a Precision Time Protocol (PTP) message from the first TEA.

16. A method for synchronizing a timing end application (TEA) in an edge communication network, comprising:

receiving, at a second access device via a network hub of the edge communication network, a time stamp from a first access device communicatively coupled to the network hub;

adjusting, at the second access device, the time stamp to at least partially account for transit time between the first and second access devices via the network hub; and after adjusting the time stamp at the second access device, transmitting the time stamp from the second access device to a TEA communicatively coupled to the second access device.

17. The method of claim 16, wherein transmitting the time stamp from the second access device to the TEA comprises transmitting the time stamp via a Precision Time Protocol (PTP) message from the second access device to the TEA.

18. The method of claim 16, wherein adjusting the time stamp to account for transit time between the first and second access devices via the network hub comprises:
   determining an offset time from a sum of a first adjustment time and a second adjustment time, the first adjustment time being based on a transit time between the first access device and the network hub, and the second adjustment time being based on a transit time between the network hub and the second access device; and
   adding the offset time to the time stamp.

19. The method of claim 18, further comprising receiving the first adjustment time at the second access device from a message including the time stamp and first adjustment time.

20. The method of claim 18, further comprising receiving the first adjustment time from a message received from the network hub.

* * * * *